(12) United States Patent
Feltham et al.

(10) Patent No.: US 9,781,320 B2
(45) Date of Patent: Oct. 3, 2017

(54) PEER TO PEER LIGHTING COMMUNICATION

(71) Applicant: International Business Machines Corporation, Armonk, NY (US)

(72) Inventors: Andrew S. Feltham, Chandlers Ford (GB); Elizabeth J. Maple, Basingstoke (GB)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 14/791,504

(22) Filed: Jul. 6, 2015

(65) Prior Publication Data

US 2016/0014311 A1    Jan. 14, 2016

(30) Foreign Application Priority Data

Jul. 8, 2014    (GB) .................................. 1412094.3

(51) Int. Cl.
*H04N 5/225*    (2006.01)
*H04N 5/247*    (2006.01)
(Continued)

(52) U.S. Cl.
CPC .......... *H04N 5/2256* (2013.01); *H04N 5/073* (2013.01); *H04N 5/0733* (2013.01);
(Continued)

(58) Field of Classification Search
CPC .... H04N 5/2256; H04N 5/2354; H04N 5/073; H04N 5/0733; H04N 5/23206; H04N 5/247
(Continued)

(56) References Cited

U.S. PATENT DOCUMENTS 6,188,431 B1    2/2001   Oie
7,221,520 B2    5/2007   Dowling et al.
(Continued)

FOREIGN PATENT DOCUMENTS

CA    2802293 A1    8/2013
EP    1881501 A1    1/2008
(Continued)

OTHER PUBLICATIONS

IBM: List of IBM Patents or Patent Applications Treated As Related (Appendix P), Jul. 6, 2015, pp. 1-2.
Pending U.S. Appl. No. 14/791,503, filed Jul. 6, 2015, entitled: "Peer to Peer Camera Communication", 23 pages.
Pending U.S. Appl. No. 14/791,506, filed Jul. 6, 2015, entitled: "Peer to Peer Audio Video Device Communication", 24 pages.
(Continued)

*Primary Examiner* — Yogesh Aggarwal
(74) *Attorney, Agent, or Firm* — Stosch Sabo

(57) ABSTRACT

A camera flash device, method and computer program for communicating between a primary camera flash device and other camera flash devices comprising: detecting orientation and position of the camera flash device and range of a primary subject in focus on the camera flash device; locating other networkable camera flash devices for communication; receiving subject data for a real time image of a subject from one or more of the located networkable camera flash devices; determining from subject data which networkable camera flash devices are pointing at the primary subject; determining two or more camera flash devices for use in a picture; and synchronizing determined two or more camera flash devices for flash operation when one or more of the camera flash devices takes a picture of the primary subject.

20 Claims, 5 Drawing Sheets

(51) Int. Cl.
*H04N 5/232* (2006.01)
*H04N 5/073* (2006.01)
*H04N 5/235* (2006.01)

(52) U.S. Cl.
CPC ....... *H04N 5/2354* (2013.01); *H04N 5/23206* (2013.01); *H04N 5/247* (2013.01)

(58) Field of Classification Search
USPC .................................. 348/207.1, 207.11, 552
See application file for complete search history.

(56) References Cited

U.S. PATENT DOCUMENTS

| | | | |
|---|---|---|---|
| 7,394,366 | B2 | 7/2008 | Moquin et al. |
| 7,840,130 | B2 | 11/2010 | Kucharyson |
| 7,990,422 | B2 | 8/2011 | Ahiska et al. |
| 8,121,468 | B2 | 2/2012 | Clark |
| 8,131,541 | B2 | 3/2012 | Yen et al. |
| 8,144,204 | B2 | 3/2012 | Strandwitz et al. |
| 8,164,617 | B2 | 4/2012 | Mauchly |
| 9,509,867 | B2 | 11/2016 | Camp, Jr. et al. |
| 2003/0133018 | A1 | 7/2003 | Ziemkowski |
| 2006/0165405 | A1 | 7/2006 | Kanai et al. |
| 2007/0223901 | A1 | 9/2007 | Fujimoto |
| 2011/0109726 | A1 | 5/2011 | Hwang et al. |
| 2011/0211096 | A1 | 9/2011 | Aagaard et al. |
| 2012/0044354 | A1 | 2/2012 | Cheng et al. |
| 2012/0169873 | A1 | 7/2012 | Hsieh |
| 2012/0268616 | A1 | 10/2012 | Strandwitz et al. |
| 2012/0307091 | A1* | 12/2012 | Yumiki .............. H04N 5/23203 348/211.4 |
| 2013/0120596 | A1 | 5/2013 | Yau |
| 2013/0120636 | A1* | 5/2013 | Baer ...................... G03B 15/05 348/335 |
| 2013/0210563 | A1 | 8/2013 | Hollinger |
| 2013/0271613 | A1 | 10/2013 | Retterath et al. |
| 2014/0028817 | A1 | 1/2014 | Brockway, III et al. |
| 2014/0043493 | A1 | 2/2014 | Bateman et al. |
| 2014/0043495 | A1 | 2/2014 | Bateman et al. |
| 2014/0362246 | A1 | 12/2014 | Nakano et al. |

FOREIGN PATENT DOCUMENTS

| | | |
|---|---|---|
| GB | 2482140 A | 1/2012 |
| JP | 5084640 B2 | 11/2012 |
| WO | 2007052269 A2 | 5/2007 |
| WO | 2012100114 A2 | 7/2012 |

OTHER PUBLICATIONS

"Communication options for Canon's Wireless File Transmitters", Canon Professional Network, http://cpn.canon-europe.com/content/education/technical/wifi_options.do, Jul. 2011, pp. 1-9.
"Compatibility information on Wi-Fi enabled Canon digital compact cameras", compatibility-information—Wireless Compact Cameras—Canon UK, http://www.canon.co.uk/for_home/product_finder/cameras/digital_camera/wi-fi/compatibility-information/, Accessed on Mar. 16, 2015, pp. 1-12.
Wikipedia, "Epipolar geometry", http://en.wikipedia.org/wiki/Epipolar_geometry, Accessed on Mar. 26, 2015, pp. 1-4.
GB Application No. 1412093.5, filed on Jul. 8, 2014, entitled: "Peer to Peer Camera Communication", 23 pages.
United Kingdom Search Report, Application No. GB1412093.5, Dated Feb. 2, 2015, 3 pages.
GB Application No. 1412094.3, filed on Jul. 8, 2014, entitled: "Peer to Peer Camera Lighting Communication", 24 pages.
United Kingdom Search Report, Application No. GB1412094.3, Dated Feb. 2, 2015, 3 pages.
GB Application No. 1412095.0, filed on Jul. 8, 2014, entitled: "Peer to Peer Audio Video Device Communication", 24 pages.
United Kingdom Search Report, Application No. GB1412095.0, Dated Jan. 14, 2015, 4 pages.
Wikipedia, "Geotagged photograph", Geotagged photograph—Wikipedia, the free encyclopedia, http://en.wikipedia.org/wiki/Geotagged_photograph#Automatic_using_a_built_in_GPS, Accessed on Mar. 26, 2015, 4 pages.
Goldstein, "Getting Started with Off-Camera Flash", Photography Blog, http://www.photographyblog.com/articles/getting_started_with_off-camera_flash/, Feb. 18, 2011, pp. 1-7.
Iqbal et al., "A Distributed Camera Network Architecture Supporting Video Adaptation", 2009 IEEE, pp. 1-7.
Solmeta, "GPS receiver for Nikon camera > Geotagger N2", Product_View, http://www.solmeta.com/Product/show/id/3 , Accessed on Mar. 26, 2015, pp. 1-2.
"Wireless Networking with Nikon Cameras", Wireless Networking with Nikon Cameras, http://cdn-10.nikon-cdn.com/pdf/nikon_wireless.pdf, pp. 1-22.
GB Office Action; Notification of Reasons for Refusal,Application No. GB1412095.0. Apr. 29, 2016. 2 pages.
Decision to Grant a Patent, Jul. 5, 2016. 2 pages.
List of IBM Patents or Patent Applications Treated as Related, Jan. 20, 2017, 2 pages.
Feltham et al., "Peer to Peer Audio Video Device Communication", U.S. Appl. No. 15/412,200, filed Jan. 23, 2017.

* cited by examiner

PEER TO PEER LIGHTING COMMUNICATION

BACKGROUND

The present invention generally relates to a method and apparatus for peer to peer camera lighting communication. In particular this relates to a method and apparatus for camera to share picture and camera lighting and flash setting within a network of cameras.

The following publications describe general networked camera lighting prior art.

U.S. Pat. No. 8,121,468 B2 discloses a wireless communication system and method for photographic flash synchronization.

U.S. Pat. No. 7,221,520 B2 discloses camera flash control using wireless technology.

US patent publication 2012/0044354 discloses versatile dual mode wireless camera hotspot device for triggering a flash.

U.S. Pat. No. 7,840,130 discloses mesh communication wireless camera system and method.

US patent publication 2012/0268616 discloses a self-contained wireless camera device, wireless camera system and method.

US patent publication 2013/0120596 discloses a method of configuring a wireless network camera.

SUMMARY

In a first aspect of the invention there is provided a camera flash device comprising: detectors for detecting orientation and position of the camera flash device and distance from a primary subject in the focus of the camera flash device; a camera network identifier for locating other networkable camera flash devices for communication; a camera network database for receiving subject data for real time image subjects from one or more of the located networkable camera flash devices; a primary subject camera identifier for determining from subject data which networkable camera flash devices are focusing on the primary subject; a camera flash option engine for determining two or more camera flash devices for use in a picture; and a camera flash synchronization engine for synchronizing determined two or more camera flash devices for flash operation when one or more of the camera flash devices takes a picture of the primary subject.

The term camera flash device covers a camera with a flash unit and any combination of an electronic device with a camera and flash functionality.

In a second aspect of the invention there is provided a method for communicating between a primary camera flash device and other camera flash devices comprising: detecting orientation and position of the primary camera flash device and range of a primary subject in the focus of the primary camera flash device; locating other networkable camera flash devices for communication; receiving subject data for a real time image of a subject from one or more of the located networkable camera flash devices; determining from subject data which networkable camera flash devices are pointing at the primary subject; determining two or more camera flash devices for use in a picture; and synchronizing determined two or more camera flash devices for flash operation when one or more of the camera flash devices takes a picture of the primary subject.

Preferably the method further comprising determining camera flash setting options for the camera flash devices.

More preferably the method further comprising selecting an optimum camera flash setting.

Still more preferably the method further comprising requesting one or more determined networkable camera flash devices to take one or more pictures of the subject.

Yet more preferably the method further comprising receiving camera capability data from determined networkable camera flash devices.

Furthermore preferably comprising determining a range of camera conditions from the determined camera flash devices.

Advantageously further determining a range of camera settings most suitable for the range of conditions and communicating those settings to appropriate determined camera flash devices.

More advantageously the camera settings are optimized according to individual the camera flash device capability.

The embodiments have an effect that operates at a camera device level and below any overlying application level. The embodiments have an effect that results in a camera device being made to operate in a new way.

In a third aspect of the invention there is provided a computer program product for communicating between a primary camera flash device and other camera flash devices, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE DRAWINGS

Preferred embodiments of the present invention will now be described, by way of example only, with reference to the following drawings in which.

DETAILED DESCRIPTION

Figure 1:
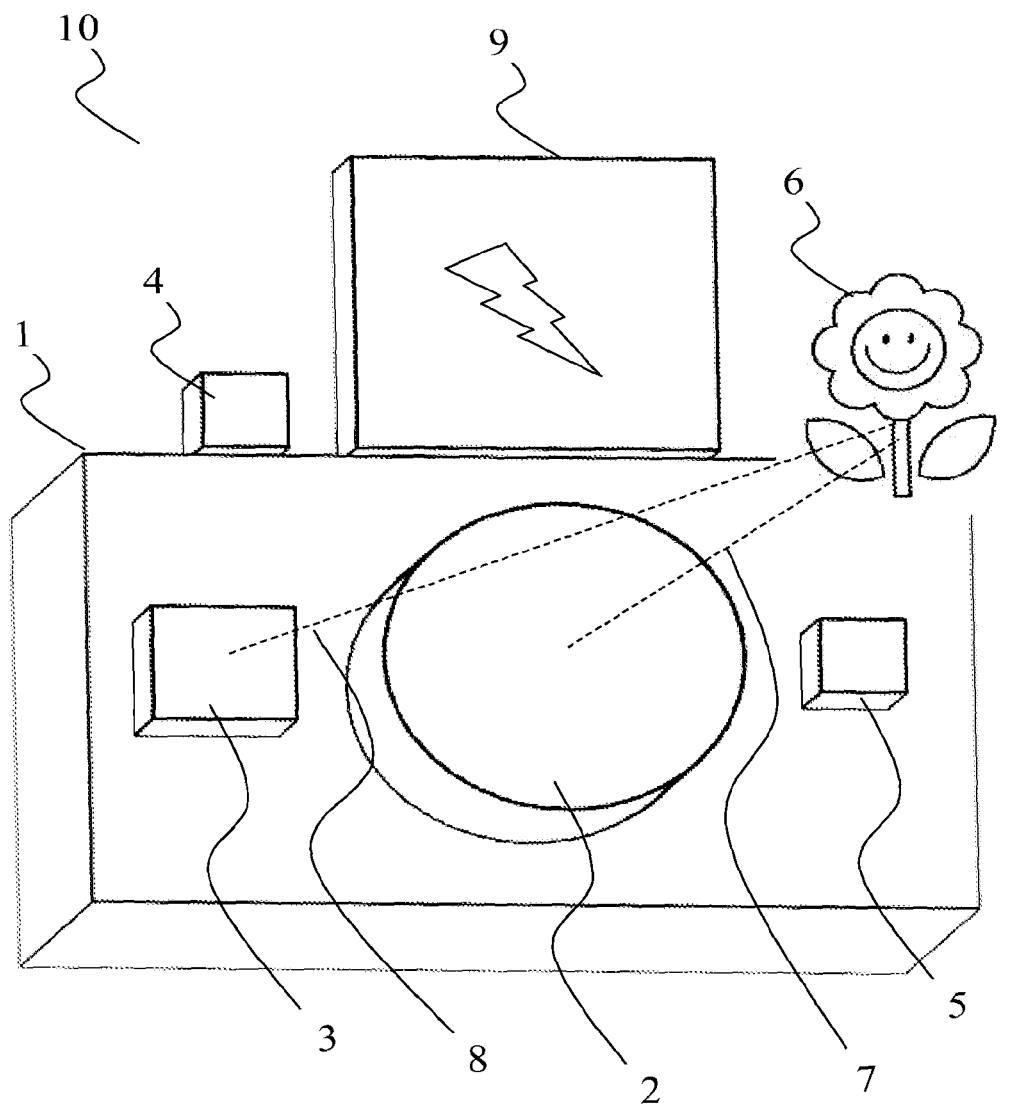
FIG. 1 is an isometric schematic diagram of a camera and flash unit according to the preferred embodiment.

Referring to FIG. 1, a camera 10 according to the preferred embodiment comprises: a camera body 1; a camera lens 2; a distance sensor 3; camera picture button 4; radio aerial 5; flash unit 9 and a camera control unit 12 (hidden from view inside camera body 1 but shown in FIG. 3) for taking a photograph of a subject 6. Further features and components are necessarily part of a functioning camera unit and the above features are a simplified list of features that can explain the preferred embodiment.

Camera body 1 supports the camera lens 2 so that a picture can be taken of subject 6 whereby light from subject 6 is collected by the lens 2 and focused onto an electronic sensor that is part of the camera control unit 12 (not shown).

Camera lens 2 is adjustable for bringing a picture into focus. The line of focus is represented by dotted line 7 from the center of the lens to subject 6.

Distance sensor 3 is for sensing the distance between the camera, represented by dotted line 8, and subject 6. Typically an infrared signal from distance sensor 3 is bounced off subject 6 and received back at distance sensor 3 such that the distance from distance sensor 3 to the subject 6 can be estimated from the journey time of the bounced infrared signal travelling at the speed of light.

Camera picture button 4 is used to control the camera to focus the camera lens on the object (typically a half depress of the button) and then take the photograph (typically a full depress of the button).

Radio aerial 5 is for sending and receiving wireless radio signals to other nearby cameras according to the preferred embodiment. In the preferred embodiment the radio signal is a low power personal network signal such a Bluetooth signal to enable a peer to peer network but other radio signal can be used including WiFi. Bluetooth is a low power wireless technology standard for exchanging data over short distances typically between personal devices in a room or car or small personal area. WiFi is a local area wireless technology that allows an electronic device to exchange data or connect to the Internet typically throughout buildings. In the preferred embodiment it is envisaged that peer to peer architecture would be the most advantageous but a client server architecture would also work. For instance, a GSM (global system for mobile telecommunications) signal can be used to create a client server embodiment where many cameras communicate with a server.

Flash unit 9 is for providing artificial light when taking pictures in low natural light such as a night or indoors.

Figure 3:
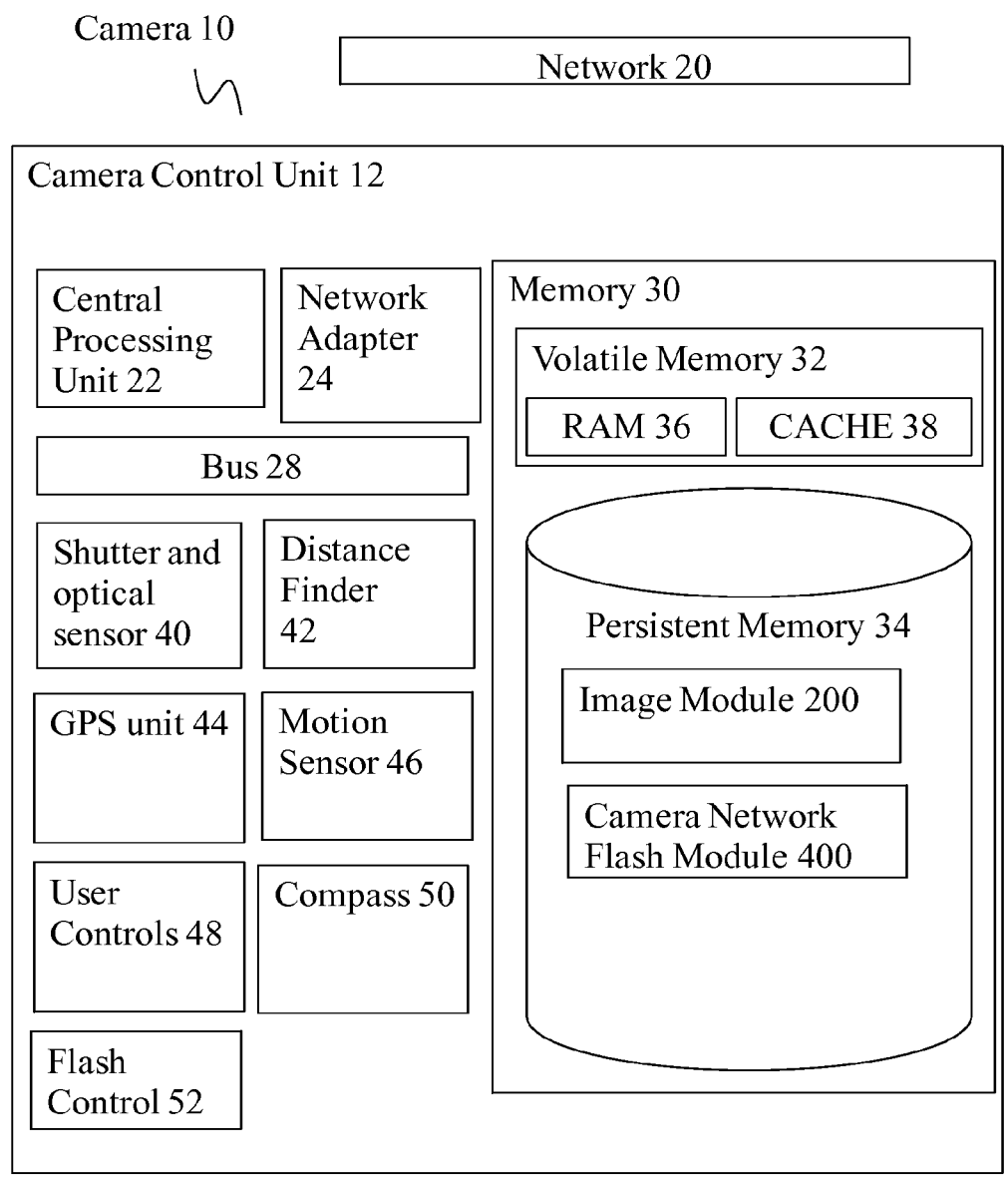
FIG. 3 is a component diagram of a camera of the preferred embodiment.

Camera control unit 12 is internal to the camera body 1 and described in FIG. 3.

Figure 2:
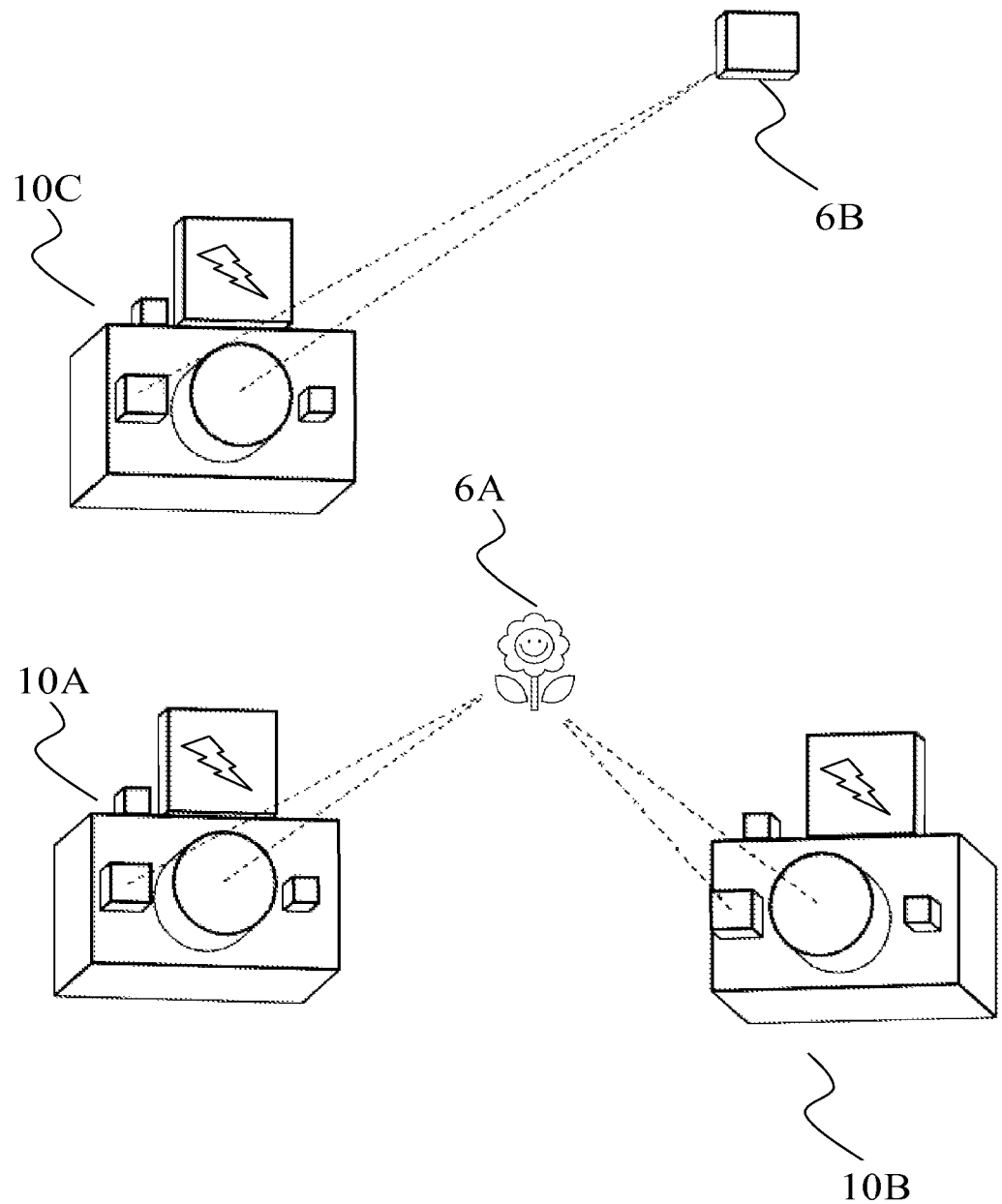
FIG. 2 is a deployment diagram of three cameras with corresponding flash units in a network according to the preferred embodiment.

FIG. 2 is an example deployment diagram of cameras 10A, 10B and 10C in a network according to the preferred embodiment. More cameras can be used but the number of cameras will be limited by the processing power of the cameras and the network bandwidth amongst other things. In this example, cameras 10A (for example the primary camera) and 10B (a networkable camera) and respective flash units are pointing to the same subject 6A whereas camera 10C (another networkable camera) is pointing its flash to another object 6B. All the cameras are capable of communicating with each other and the preferred embodiment determines those networkable cameras that are pointing to the same subject 6A.

Referring to FIG. 3, the camera control unit 12 of camera 10 is described. Camera 10 is a combination of a mechanical, electronic and computer system wherein the camera control unit 12 may be described in the general context of computer system including computer system-executable instructions, such as program modules, being executed by a computer processor. Generally, program modules may include routines, programs, objects, components, logic, and data structures that perform particular tasks or implement particular abstract data types.

Camera control unit 12 comprises: central processing unit (CPU) 22; network adapter 24; bus 28; memory 30; shutter and optical sensor 40; distance finder 42; GPS unit 44; motion sensor 46; user controls 48; compass 50; and flash control 52.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the cameras or a computer server (not shown).

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital versatile disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises image module 200 and camera network module 400. Further program modules that support the preferred embodiment but are not shown include firmware, boot strap program, operating system, and support applications. Each of the operating system, support applications, other program modules, and program data or some combination thereof, may include an implementation of a networking environment.

Image module 200 is a known camera control mechanism for taking a picture.

Camera network module 400 is for working with existing camera control mechanisms to take a picture according to the preferred embodiment and is described in more detail below.

Shutter and optical sensor 40 is for taking the picture and recording a picture image as pixels on the optical sensor.

Distance finder 42 is for controlling the distance sensor 3 and calculating the distance between the distance sensor and a subject.

GPS (Global Positioning System) unit 44 is for calculating the absolute position in space of the camera.

Motion sensor 46 is for fine tuning the absolute position calculation as the camera is moved.

User controls 48 is the interface for all user controls including the camera picture button 4.

Compass 50 is a three dimensional gyroscope compass for determining the precise orientation of the camera in order to determine where the camera is pointing so that the subject of the picture may be subsequently determined.

Flash control 52 is for controlling flash unit 9 so as to create a flash of light of a certain brightness and duration as determined by the camera network flash module 400.

Figure 4:
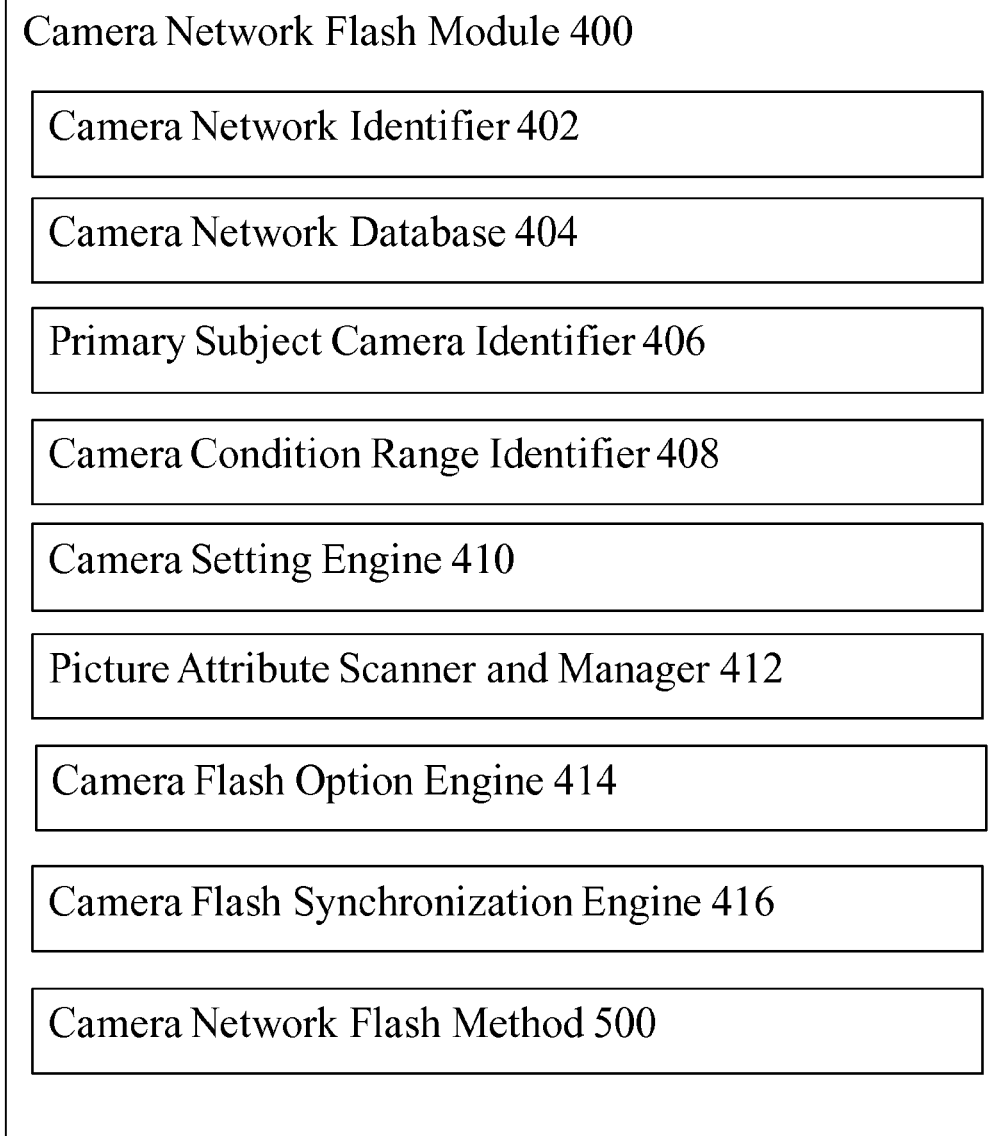
FIG. 4 is a component diagram of a camera network flash module of the preferred embodiment.

Referring to FIG. 4, camera network flash module 400 comprises the following components: camera network identifier 402; camera network database 404; primary subject camera identifier 406; camera condition range identifier 408; camera setting engine 410; picture attribute scanner and manager 412; camera flash option engine 414; camera flash synchronization engine 416 and camera network flash method 500.

Camera network identifier 402 is for identifying a network of camera flash devices.

Camera network database 404 is for receiving subject data and camera capability data from the networked camera flash devices.

Primary subject camera identifier 406 is for identifying a primary subject and corresponding camera flash devices from the subject data of the networked cameras.

Camera condition range identifier 408 is for determining a range of environmental conditions for each networked camera flash device such as distance from camera and amount of background and foreground light on primary subject.

Camera setting engine 410 is for determining camera and camera setting pairings from the range of environmental conditions and the camera capability data.

Picture attribute scanner and manager 412 is for determining and managing picture attributes.

Camera flash option engine 414 is for determining the different flash options available with other primary subject camera flash devices.

Camera flash synchronization engine 416 is for synchronizing selected camera flash devices so that they flash at the same time as a picture is taken of a primary subject.

Camera network flash method 500 is for controlling and managing components in accordance with the preferred embodiment.

Figure 5:
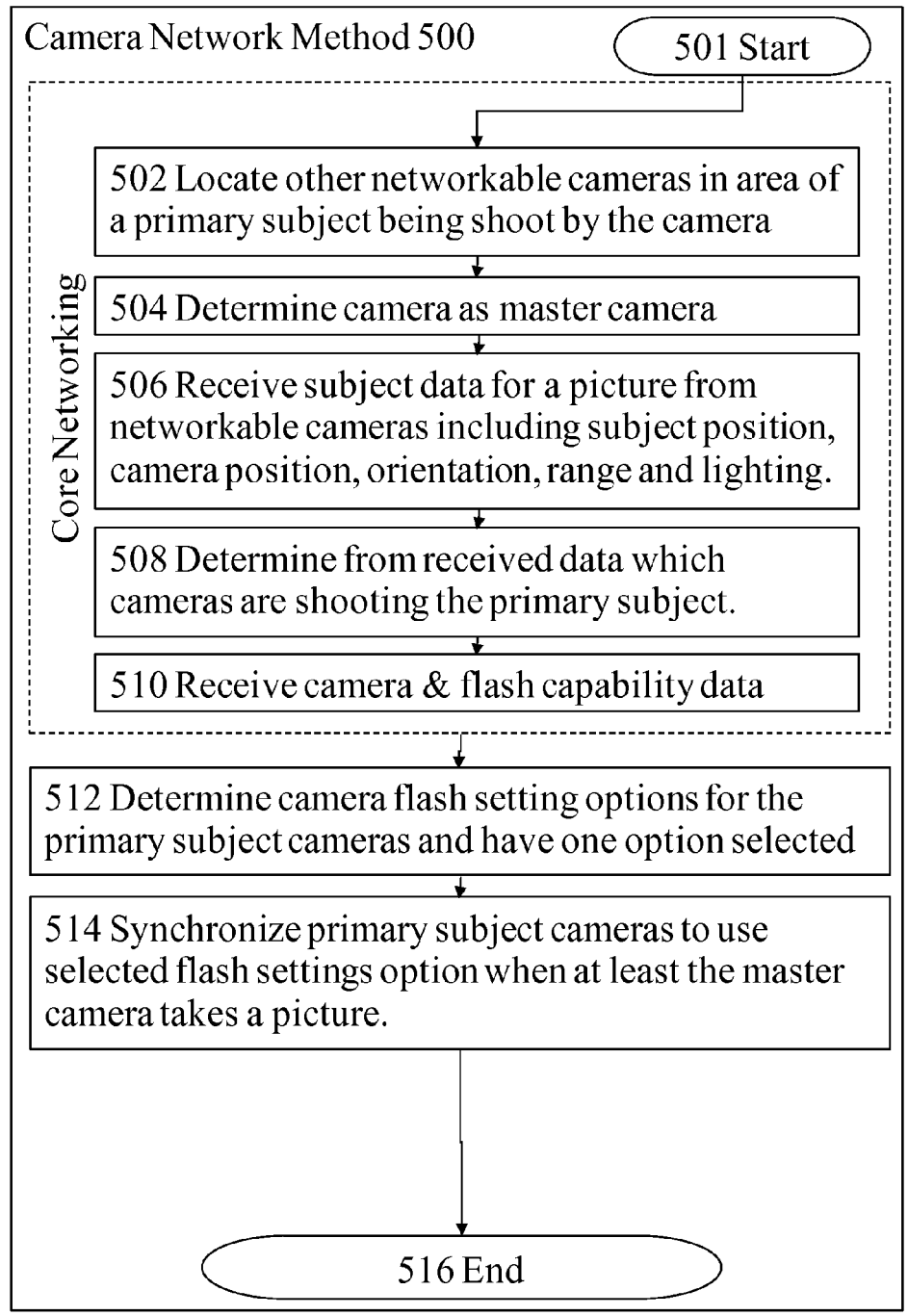
FIG. 5 is a flow diagram of a process of the preferred embodiment.

Referring to FIG. 5, camera network flash method 500 comprises logical process steps 501 to 516.

Step 501 is the start of camera network method 500. The preferred camera embodiment is always in network mode and the method is started when picture button 4 is half depressed for focusing on a primary subject. Other embodiments are envisaged where a camera can select and deselected network mode. When a primary subject is focused on, then the orientation and position of the primary camera flash device and the range of a primary subject are measured.

Step 502 is for locating other networkable cameras in network area of a primary subject being shoot by the camera. The network area can be the whole possible network area or a restricted part of the possible network area.

Step 504 is for determining the camera with the half depressed picture button 4 as master camera.

Step 506 is for receiving subject data for a picture from networkable camera flash devices including subject position, camera position, orientation, range and lighting conditions.

Step 508 is for determining from received data which camera flash devices are shooting the primary subject.

Step 510 is for receiving camera and flash capability data.

Steps 502 to 510 are the core networking steps that the embodiments are based on. As a result of the core networking steps the master camera flash device can utilize the subject data and image data from both its own detectors and determined network cameras to take a picture of the subject.

Step 512 is for determining camera flash setting options for the primary subject cameras and having one option selected. This option can be selected by an algorithm to choose the optimum flash combinations and optionally presented to a user to confirm or select manual from the options. In another embodiment, there are no options and a user may select flash combinations manually.

Step 514 is for synchronizing the primary subject cameras to use selected flash settings options and when at least the master camera takes a picture.

Step 516 is the end of the method.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

A further embodiment of the invention is a computer program product defined in terms of a system and method. The computer program product may include a computer-readable storage medium (or media) having computer-readable program instructions thereon for causing a processor to carry out aspects of the present invention. Such a program can be transferred to an existing camera as an update to its operating system.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose camera, special purpose camera, camera device, a device with a camera, or other programmable data processing apparatus to produce a machine with a camera, such that the instructions, which execute via the processor, create means for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A camera flash device comprising:
   detectors for detecting the orientation and position of the camera flash device and the distance from a subject in focus on the camera flash device;
   a camera network identifier for locating networkable camera flash devices for communication across a network, wherein the camera network identifier is configured to locate the networkable camera flash devices in response to a picture button on the camera flash device being partially depressed, and wherein the camera flash device is configured to set the camera flash device as a master camera flash device in response to the picture button being partially depressed;
   a camera network database for receiving subject data for real time image subjects from one or more of the networkable camera flash devices;
   a primary subject camera identifier for determining from subject data which networkable camera flash devices are focused on the subject;
   a camera flash option engine for determining two or more subject camera flash devices for use in a picture; and
   a camera flash synchronization engine for synchronizing said two or more subject camera flash devices for flash operation when one or more of the subject camera flash devices takes a picture of the subject.

2. The camera flash device of claim 1, wherein the camera flash option engine is for determining camera flash setting options for the networkable camera flash devices.

3. The camera flash device of claim 1, wherein the camera flash option engine is further for selecting an optimum camera flash setting option.

4. The camera flash device of claim 1, wherein the camera flash device requests one or more of the networkable camera flash devices to take one or more pictures of the subject.

5. The camera flash device of claim 1, wherein the camera flash device receives camera capability data from the networkable camera flash devices.

6. The camera flash device of claim 1, wherein the camera flash device determines a range of camera conditions from the networkable camera flash devices.

7. The camera flash device of claim 6, wherein the camera flash device determines a range of camera settings suitable for the range of conditions and communicates the camera settings to the networkable camera flash devices.

8. The camera flash device of claim 6, wherein the range of camera conditions from the networkable camera flash devices comprises a respective amount of background light on the primary subject and a respective amount of foreground light on the primary subject.

9. The camera flash device of claim 1, wherein camera settings are optimized according to an individual camera flash device capability.

10. The camera flash device of claim 1, wherein the network is a peer-to-peer network.

11. The camera flash device of claim 1, wherein the networkable camera flash devices exchange the one or more pictures.

12. The camera flash device of claim 1, wherein the camera network identifier for locating networkable camera flash devices for communication across a network is configured to locate networkable camera flash devices in a restricted part of the possible network area, wherein the restricted part of the possible network area comprises an area of the primary subject.

13. A method for communicating between a primary camera flash device and other camera flash devices comprising:
   detecting orientation and position of the primary camera flash device and distance from a subject in focus on the primary camera flash device;
   locating other networkable camera flash devices for communication across a network in response to a picture button on the primary camera flash device being partially depressed, wherein the primary camera flash device is configured to set the primary camera flash device as a master camera flash device in response to the picture button being partially depressed;
   receiving subject data for a real time image of the subject from one or more of the networkable camera flash devices;
   determining from the subject data which networkable camera flash devices are pointing at the subject;
   determining two or more camera flash devices for use in a picture; and
   synchronizing two or more of the camera flash devices for flash operation when one or more of the camera flash devices takes a picture of the subject.

14. The method of claim 13, further comprising:
    determining camera flash setting options for primary camera flash device and the networkable camera flash devices.

15. The method of claim 13, further comprising:
    selecting an optimum camera flash setting.

16. The method of claim 13, further comprising:
    requesting one or more of the networkable camera flash devices to take one or more pictures of the subject.

17. The method of claim 13, further comprising:
    receiving camera capability data from the networkable camera flash devices.

18. The method of claim 13, further comprising:
    determining a range of camera conditions from the networkable camera flash devices.

19. The method of claim 18, further comprising:
    determining a range of camera settings most suitable for the range of conditions and communicating the camera settings to the networkable camera flash devices.

20. A computer program product for communicating between a primary camera flash device and other camera flash devices, the computer program product comprising:
    one or more computer-readable storage media and program instructions stored on the one or more computer-readable storage media, the program instructions comprising:
    program instructions to detect orientation and position of the primary camera flash device and distance from a subject in focus on the primary camera flash device;
    program instructions to locate networkable camera flash devices for communication across a network in response to a picture button on the primary camera flash device being partially depressed, wherein the primary camera flash device is configured to set the primary camera flash device as a master camera flash device in response to the picture button being partially depressed;
    program instructions to receive subject data for a real time image of a subject from one or more of the networkable camera flash devices;
    program instructions to determine from the subject data which networkable camera flash devices are pointing at the subject;

program instructions to determine two or more camera flash devices for use in a picture; and program instructions to synchronize the two or more camera flash devices for flash operation when one or more of the networkable camera flash devices takes a picture of the subject.

\* \* \* \* \*